United States Patent
Kim et al.

(10) Patent No.: US 12,428,553 B2
(45) Date of Patent: Sep. 30, 2025

(54) RESIN COMPOSITION

(71) Applicants: Solus Advanced Materials Co., Ltd., Iksan (KR); SEGI ENC CO., LTD., Bucheon (KR)

(72) Inventors: Hongsuk Kim, Yongin (KR); Chanwoo Kim, Yongin (KR); Kijung Yang, Yongin (KR)

(73) Assignees: Solus Advanced Materials Co., Ltd., Iksan (KR); SEGI ENC CO., LTD., Bucheon (KR)

( * ) Notice: Subject to any disclaimer, the term of this patent is extended or adjusted under 35 U.S.C. 154(b) by 708 days.

(21) Appl. No.: 17/766,734

(22) PCT Filed: Nov. 11, 2021

(86) PCT No.: PCT/KR2021/016411
§ 371 (c)(1),
(2) Date: Apr. 6, 2022

(87) PCT Pub. No.: WO2022/108238
PCT Pub. Date: May 27, 2022

(65) Prior Publication Data
US 2023/0287209 A1     Sep. 14, 2023

(30) Foreign Application Priority Data
Nov. 23, 2020 (KR) .................. 10-2020-0158089

(51) Int. Cl.
*C08L 63/00* (2006.01)
(52) U.S. Cl.
CPC ......... *C08L 63/00* (2013.01); *C08L 2205/025* (2013.01)
(58) Field of Classification Search
CPC ............... C08L 63/00; C08L 2205/025
See application file for complete search history.

(56) References Cited

U.S. PATENT DOCUMENTS 9,102,786 B2     8/2015  Sato
2018/0224604 A1  8/2018  Kondou

FOREIGN PATENT DOCUMENTS

| CN | 104345371 A | 2/2015 |
| CN | 104813741 A | 7/2015 |
| CN | 106479128 A | 3/2017 |
| CN | 107300829 A | 10/2017 |
| CN | 107641490 A * | 1/2018 |
| CN | 109416426 A | 3/2019 |
| EP | 4001341 A1 | 5/2022 |
| GB | 1194086 A | 6/1970 |
| JP | 2009084310 A | 4/2009 |
| JP | 2018016796 A | 2/2018 |
| JP | 2019001995 A | 1/2019 |
| KR | 20090072655 A | 7/2009 |
| WO | 2014083850 A1 | 6/2014 |

OTHER PUBLICATIONS

Machine translation of WO 2014/083850 A1, published Jun. 5, 2014.*

* cited by examiner

*Primary Examiner* — Vicky Nerangis
(74) *Attorney, Agent, or Firm* — Harvest IP Law, LLP

(57) ABSTRACT

The present invention relates to a resin composition and an epoxy resin composition for display comprising the resin composition. More particularly, the present invention provides a transparent epoxy material that can be applied by various methods such as ink-jetting, dispensing, etc. to fill a gap by spraying a low-viscosity liquid and then be cured. The transparent epoxy material generates a little amount of gas during curing, has high reliability at high temperature and high humidity after curing so that there is no cracking between layers, and can be used in applications such as molding and bonding of glass parts of organic or inorganic light emitting display. The epoxy resin composition according to the present invention not only has excellent processability and excellent electrical, mechanical, and chemical properties of the existing liquid epoxy material, and but also as good optical properties, thereby providing workability, productivity, and reliability to a user working on packaging of organic light emitting displays.

10 Claims, No Drawings

RESIN COMPOSITION

TECHNICAL FIELD

The present invention relates to a resin composition. More specifically, the present invention relates to a uni-, bi-, tri- or tetra-functional epoxy resin composition having high adhesiveness and high reliability.

BACKGROUND ART

Due to change in users' demands for high integration and lightness, thinness, and smallness of display devices, display materials have changed physically and chemically in their properties and methods of use thereof. Conventionally, cathode ray tubes (CRTs) employing electron beams and fluorescent materials, field emission displays (FEDs)_using light emission of emitter arrays, plasma display panels (PDPs) using photoelectric effects of plasma gas, liquid crystal displays (LCDs) using orientation and movement of liquid crystal molecules, etc. have been widely used in the industry. However, there have been problems such as large weights of displays, poor dynamic screen display quality, heat generation, burn-in phenomenon, high power consumption, etc.

To solve the problems of the displays, an organic light emitting display (OLED) device has been developed since the late 1980s, and the developed organic light emitting display has a smaller weight than the existing displays, excellent readability and contrast ratio, and excellent power efficiency and response speed. However, the OLED display device also suffered burn-in phenomena and exhibited vulnerability to changes in external temperature and external humidity.

Epoxy resin is a typical thermosetting resin having a three-dimensional network structure that is transformed from a linear structure through a curing process. Due to good physical properties such as heat resistance, corrosion resistance, adhesiveness, and insulating characteristics, epoxy resin industrially occupies a very important position as an electrical and electronic material. The main reasons why the epoxy resin can be used in the field of electrical and electronic materials are i) it can provide a variety of required physical properties due to presence of various resin types and various curing agents therefore, ii) it has excellent inherent physical properties such as high adhesiveness, good mechanical properties, good chemical resistance, etc., iii) it exhibits small shrinkage deformation during a curing reaction compared to other thermosetting resins, iv) it has a long shelf life and generates no byproducts during reaction when properly formulated as a one-component product and when formulated as a two-component product while using an appropriate curing agent, and iv) it can be molded into complicated shapes, thereby being suitably used for packaging of electrical components because it can be processed by transfer molding, coating, casting, and manual paining, etc.

However, although epoxy resin has the above advantages, it has disadvantages in that it is vulnerable to high temperature and humidity (hot/wet property), it is considerably brittle due to high-density crosslinking thereof, thereby being easily destroyed even by a light impact, and it has a limitation that rework is not easy when product repair is required after curing. Moreover, it is well known that epoxy resin has limited use due to the physical and chemical properties of epoxy resin itself as well as the problem of moisture absorption after curing reaction using a curing agent.

Therefore, there is a need for an epoxy resin composition that maintains the inherent mechanical, chemical, and thermal properties of the epoxy resin, is transparent, and is free of problems that occurred conventionally after a curing reaction using a curing agent.

DISCLOSURE

Technical Problem

Accordingly, the technical objective of the present invention has been conceived in this respect, and an objective of the present invention is to provide a one-component epoxy resin composition having high transparency, high adhesiveness, and high reliability.

Technical Solution

In order to accomplish the above objective, the present invention provides a resin composition comprising a first epoxy resin, a second epoxy resin, and a thermal curing agent, in which after the resin composition is prepared as a film, the resin composition exhibits a transmittance of 90% or more when measured with a spectrometer at a wavelength range of 400 nm to 780 nm, and a refractive index of 1.4 or more when measured with a refractometer.

The resin composition may have a viscosity of 10 cPs to 100000 cPs and a thixotropic index of 1 to 3 when measured with a viscometer at 25° C. and a speed of 5 rpm.

The resin composition may exhibit a weight loss of less than 1%.

When the resin composition is applied to a glass thickness of 300 μm on both sides of release paper, cured with an exposure system, and then left at 90° C. for 1 hour in a convection oven, fumes of 1% or less is measured by comparing the weight before and after the leaving in the convection oven.

The resin composition may include 15 to 30 parts by weight of the first epoxy resin and 50 to 90 parts by weight of the second epoxy resin, and the thermal curing agent may be included in an amount of 0.5 to 5.0 parts by weight.

The first epoxy resin may include a compound represented by Chemical Formula 1 below.

Chemical Formula 1

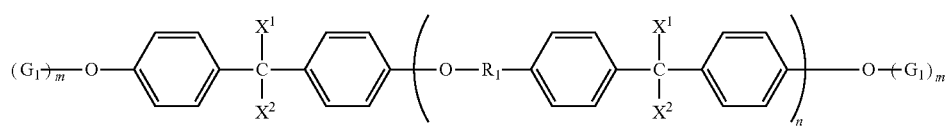

In Chemical Formula 1, $G_1$ is an organic group containing a glycidyl group, $X^1$ and $X^2$ are each independently hydrogen or a methyl group, $R_1$ is a substituted or unsubstituted alkylene or alkenylene having 10 to 100 carbon atoms, n is an integer in the range of 0 to 10, and m is an integer in the range of 0 to 1.

The second epoxy resin may include at least one resin selected from the group consisting of an epoxy resin including a compound represented by Chemical Formula 2 below, a phthalic acid modified epoxy resin, a phthalic acid modified epoxy resin having a transparent structure, a polypropylene glycol added epoxy resin having a transparent structure, a polyethylene glycol added epoxy resin having a transparent structure, and a cycloaliphatic resin.

Chemical Formula 2

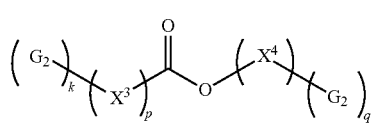

In Chemical Formula 2, $G_2$ is an organic group containing a glycidyl group, $X^3$ and $X^4$ are each independently substituted or unsubstituted alkylene or alkenylene having 1 to 100 carbon atoms, k is an integer in the range of 0 to 10, and p and q are each independently an integer in the range of 0 to 10.

The transparent structure may be prepared with any one component of a substituted or unsubstituted alkylene or alkenylene group, or a cyclic aliphatic hydrocarbon group, each group having 10 to 100 carbon atoms.

The first epoxy resin may include any one or more resins from the group consisting of a bisphenol F diglycidyl ether type epoxy resin, a bisphenol A diglycidyl ether type epoxy resin, a polyolefin addition bisphenol A diglycidyl ether type epoxy resin, a polyolefin addition bisphenol F diglycidyl ether type epoxy resin, a 1,6-hexanediol diglycidyl ether type epoxy resin, a 1,4-diglycidyl ether type epoxy resin, and a cydoaliphatic diglycidyl ether type epoxy resin.

The second epoxy resin is a polyfunctional epoxy resin that is tri- or higher-functional. The tri- or higher-polyfunctional epoxy resin include any one or more resins selected from the group consisting of a phenol novolac type epoxy resin, a cresol novolac type epoxy resin, a bisphenol A modified phenol novolac epoxy resin, a liquid bismaleimide added epoxy resin, trimethylolpropane triglycidyl ether type epoxy resin, polyvalent cycloaliphatic epoxy resin, triglycidyl isocyanurate type epoxy resin, aminophenol addition diglycidyl ether type epoxy resin, N,N,N',N'-tetraglycidyl-4,4'-methylenebisbenzeneamine resin, and polyvalent oxetane resin.

The thermal curing agent may include one or more selected from the group consisting of tetradecyl (trihexyl) phosphonium dicyandiamide, 1-butyl-3-methylimidazolium tetrafluoroborate, 1-ethyl-3-methylimidazolium tetrafluoroborate, 1-ethyl-3-methylimidazolium methanesulfonate, toluylcumyl iodonium tetrakis(pentafluorophenyl)borate, Opton CP-66, Opton CP-77 (Adeka, Japan), 2-ethyl-4methyl imidazolium tetraphenylborate, tetraphenylphosphonium tetraphenylborate, quaternary ammonium borate, (4-acetoxyphenyl)benzyl(methyl)sulfonium, tetrakis(pentafluorophenyl)borate, SI-B2, SI-B3, SI-B3A, SI-B4, and SI-B7 (Samshin Chemical).

The thermal curing agent may include one or more selected from the group consisting of Ajicure MY-24, Ajicure MY-H, Ajicure PN-23, Ajicure PN-H, Ajicure PN-31, Ajicure PN-40, Ajicure PN-50, VDH, VDH-J, AH-154, ADH, DDH, SAH, IDH, SDH, LDH, UDH, Ancamine 2441, Ancamine 2442, Ancamine 2014AS, Technicure LC-80, Technicure LC-100, Technicure LC-214, Technicure MDU-11, Technicure PDU-250, Technicure IPDU-8, Technicure TDU-200, EH-4357, Novacure HX-3721, Novacure HX-3722, Novacure HX-3748, Novacure HX-3741, Novacure HX-3742, Novacure HX-3088, Novacure HX-3613, Novacure HX-3921HPE, Novacure HX-3941HPE, Novacure HX-3932HPE, FXR-1081, FXR-1020, and FXR-1060I.

The resin composition may further include an additive in an amount of 0.1 to 10 parts by weight.

The resin composition may be a liquid or paste.

Advantageous Effects

The epoxy resin composition according to the present invention has advantage in that it has processability and electrical, mechanical, and chemical properties as good as those of existing liquid epoxy materials, and exhibits optical properties, thereby providing workability, productivity, and reliability to a user.

BEST MODE

Hereinafter, the present invention will be described in detail. However, it is not limited only by the following description, but each element may be variously modified or selectively mixed as needed. Therefore, it should be understood to include all modifications, equivalents and substitutes included in the spirit and scope of the present invention.

Mode for Invention

A preferred example of a resin composition according to the present invention will be described. The resin composition according to the present invention may include an epoxy resin including a first epoxy resin and a second epoxy resin, and a thermal curing agent. In addition, the resin composition according to the present invention may further include an additive as necessary. Hereinafter, the resin composition according to the present invention will be described in more detail.

First Epoxy Resin

In the present invention, the first epoxy resin is a uni-, bi-, tri-, or tetra-functional epoxy resin including one epoxy group, and serves to give high reliability, contribute to the curing structure of the composition, relieve the stress between each substrate of a display, and improve adhesion between a chip and a substrate.

The first epoxy resin, which is a uni-, bi-, tri-, or tetra-functional epoxy compound, may include a diglycidyl ether-based epoxy resin. The diglycidyl ether-based epoxy resin may include any one or more selected from the group consisting of bisphenol F diglydicyl ether type epoxy resin, bisphenol A diglydicyl ether type epoxy resin, polyolefin addition bisphenol A diglydicyl ether type epoxy resin, polyolefin addition bisphenol F diglydicyl ether type epoxy resin, polyolefin A diglydicyl ether-type epoxy resin, 1,6-hexanediol diglydicyl ether type epoxy resin, 1,4-butanediol diglydicyl ether type epoxy resin, and a cycloaliphatic diglydicyl ether type epoxy resin, but is not limited thereto.

In addition, the content of the first epoxy resin may be 5 to 60 based on the weight of the total epoxy composition. Preferably, the content of the first epoxy resin may be 15 to 25 parts by weight, and more preferably, the content of the first epoxy resin may be 15 to 20 parts by weight. When the content of the first epoxy resin is lower than 5 parts by weight, the time for which the product can be used at room temperature is reduced, thereby having a negative effect reliability at high temperature and high humidity reliability. In addition, the inherent hardness of the composition increases and thus the composition is brittle. Therefore, the composition is easily destroyed even by light impact and exhibits reduced adhesiveness.

Meanwhile, the first epoxy resin may be a compound represent by Chemical Formula 1.

Chemical Formula 2

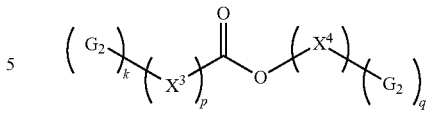

In Chemical Formula 2, $G_2$ is an organic group containing a glycidyl group, $X^3$ and $X^4$ are each independently substituted or unsubstituted alkylene or alkenylene having 1 to 100 carbon atoms, k is an integer in the range of 0 to 10, and p and q are each independently an integer in the range of 0 to 10.

Chemical Formula 1

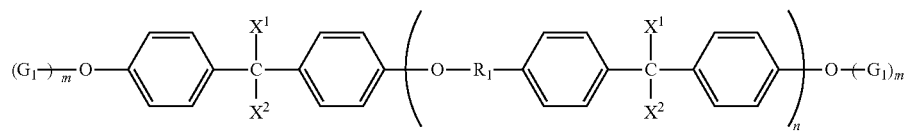

In Chemical Formula 1, $G_1$ is an organic group containing a glycidyl group, $X^1$ and $X^2$ are each independently hydrogen or a methyl group, $R_1$ is a substituted or unsubstituted alkylene or alkenylene having 10 to 100 carbon atoms, and n is an integer in the range of 0 to 10.

Second Epoxy Resin

The second epoxy resin in the present invention is a uni-, bi-, tri-, or tetra-functional epoxy resin including one epoxy group or a polyfunctional epoxy resin including 3 or more epoxy groups, and serves to give high reliability, contribute to the curing structure of the composition, relieve the stress between the substrates of a display, improve adhesion between a chip and a substrate, and to provide high transparency by improving transparency of a product.

In the present invention, the uni-, bi-, tri-, or tetra-functional epoxy resin including one or more epoxy groups may include any one or more selected from the group consisting of an epoxy resin including a compound represented by Chemical Formula 2 below, phthalic acid modified epoxy resin, phthalic acid modified epoxy resin having a transparent structure, a polypropylene glycol added epoxy resin having a transparent structure, a polyethylene glycol added epoxy resin having a transparent structure, and a cycloaliphatic resin. The transparent structure may be prepared with any one component of a substituted or unsubstituted alkylene or alkenylene group, or a cycloaliphatic group having 5 to 100 carbon atoms. The polyfunctional epoxy resin which is tri- or higher-functional, may include any one or more selected from the group consisting of phenol novolac type epoxy resin, cresol novolac type epoxy resin, bisphenol A modified phenol novolac epoxy resin, liquid bismaleimide added epoxy resin, trimethylolpropane triglycidyl ether type epoxy resin, polyvalent cycloaliphatic epoxy resin, triglycidyl isocyanurate type epoxy resin, aminophenol addition diglycidyl ether type epoxy resin, N,N,N',N'-tetraglycidyl-4,4'-methylenebisbenzeneamine resin, and polyvalent type oxetane resin.

The second epoxy compound may be a compound represented by Chemical Formula 2 below.

In addition, the content of the second epoxy resin may be 25 to 95 parts by weight based on the weight of the total resin composition. Preferably, the content of the second epoxy resin may be 50 to 90 parts by weight, and more preferably, the content of the second epoxy resin may be 65 to 85 parts by weight. When the content of the second epoxy resin is lower than 10 parts by weight, there is a problem in that the optical properties such as transparency and refractive index, etc. of the product are deteriorated, and the adhesiveness is reduced.

Thermal Curing Agent

The thermal curing agent in the present invention is a thermosetting polymer for helping the epoxy resin exhibit the functionality thereof, and the thermal curing agent helps the epoxy resin exhibit the unique properties thereof through a curing reaction.

Conventionally, a curing agent composed of an amine, an acid, a phenol, etc. has been used. Specifically, a curing agent having adhesiveness, good electrical properties, and resistance to high temperature and high humidity which are characteristics distinguishing it from other plastic materials has been selected and used. A typical curing reaction between a conventional epoxy resin and an amine curing agent is as follows.

Reaction Formula 1

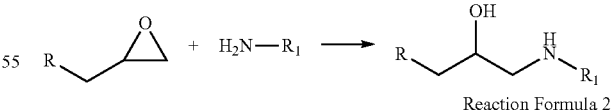

Reaction Formula 2

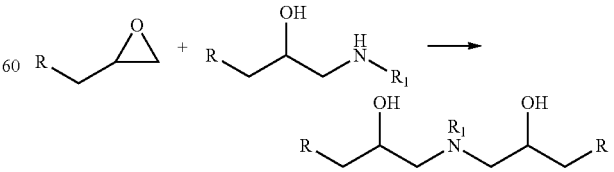

First, the amine curing agent attacks and opens the epoxy ring of the epoxy resin. Then, the amine curing agent binds to a specific position, so that the number of epoxy-amine molecule increases, thereby attacking the surrounding epoxy resin and causing a chain reaction. When the amine-bound molecules are almost consumed, the reaction ends and a dense structure is formed. The reaction is called a curing reaction. In the reaction, the hydroxyl group inevitably appearing has a significant effect on adhesiveness and pot life, which is the time until curing but has a disadvantage of reducing moisture resistance and reliability.

To alleviate the problem, in the present invention, a thermal curing agent capable of causing epoxy resins to directly react with each other during a curing reaction is used. The curing reaction according to the present invention is as follows.

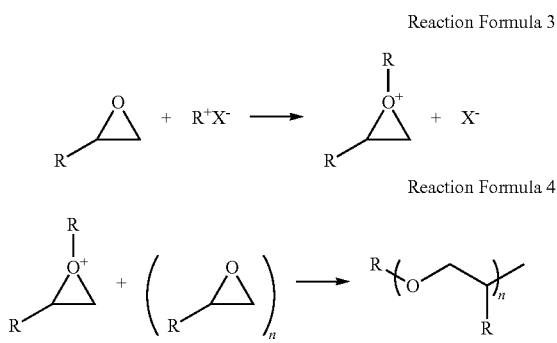

Reaction Formula 3

Reaction Formula 4

In the reaction, a hydroxy group is not generated as a reaction product unlike the conventional epoxy-amine reaction, and a cured product having a long fibrous molecular structure can be obtained. For this reason, a structure advantageous for long-term reliability can be obtained unlike the existing epoxy-curing agent reaction.

The thermal curing agent may include any or commercially used curing agent. The thermal curing agent may include one or more selected from the group consisting of tetradecyl (trihexyl) phosphonium dicyandiamide 1-butyl-3-methylimidazolium tetrafluoroborate, 1-ethyl-3-methylimidazolium tetrafluoroborate, 1-ethyl-3-methylimidazolium methanesulfonate, tolylcumyl iodonium tetrakis(pentafluorophenyl)borate, Opton CP-66, Opton CP-77 (Adeka, Japan), 2-ethyl-4methyl imidazolium tetraphenylborate, tetraphenylphosphonium tetraphenylborate, quaternary ammonium borate, (4-acetoxyphenyl)benzyl(methyl)sulfonium, tetrakis(pentafluorophenyl)borate, SI-B2, SI-B3, SI-B3A, SI-B4, and SI-B7 (Samshin Chemical), but is not limited thereto.

Meanwhile, the content of the thermal curing agent may be 0.5 to 5.0 parts by weight based on the weight of the total resin composition. Preferably, it may be 0.5 to 3.0 parts by weight, and more preferably, it may be 0.5 to 1.5 parts by weight. When the content of the thermal curing agent is lower than 0.5 parts by weight, there is a problem that an uncured material may remain. When the content exceeds 1.5 parts by weight, in the pot life at room temperature or high temperature may be shortened, there may be a risk of heat generation during curing, and clogging-hardening of the dispensing needle tip may occur during a dispensing process, which may affect the user's use of the product.

In addition, in the present invention, when physical or chemical properties are expressed with the use of a curing agent other than the above-described thermal curing agent, a commercially available curing agent may be used. The thermal curing agent may include any one or more selected from the group consisting of Ajicure MY-24, Ajicure MY-H, Ajicure PN-23, Ajicure PN-H, Ajicure PN-31, Ajicure PN-40, Ajicure PN-50, VDH, VDH-J, AH-154, ADH, DDH, SAH, IDH, SDH, LDH, UDH, Ancamine 2441, Ancamine 2442, Ancamine 2014AS, Technicure LC-80, Technicure LC-100, Technicure LC-214, Technicure MDU-11, Technicure PDU-250, Technicure IPDU-8, Technicure TDU-200, EH-4357, Novacure HX-3721, Novacure HX-3722, Novacure HX-3748, Novacure HX-3741, Novacure HX-3742, Novacure HX-3088, Novacure HX-3613, Novacure HX-3921HPE, Novacure HX-3941HPE, Novacure HX-3932HPE, FXR-1081, FXR-1020, and FXR-1060I, but is not limited thereto. The curing agent has a microcapsule form in which the epoxy resin encloses an imidazole curing accelerator and can promote curing action of the epoxy composition only at a high temperature of 80° C. to 100° C., thereby having excellent storage stability at room temperature.

Additive

The resin composition according to the present invention may include a first epoxy resin, a second epoxy resin, and a thermal curing agent, and may further include an additive as necessary.

The additive enhances the property of the epoxy resin flowing into the gap between the chip and the substrate, thereby preventing a void from occurring in the gap.

The additive may include any one or more selected from the group consisting of BYK 018, BYK 019, BYK 021, BYK 024, BYK 066N, BYK 909, ethoxy ethanol, and mono ether glycol polyethylene, but is not limited thereto.

The content of the additive may be 1.0 to 10.0 parts by weight based on the weight of the total epoxy composition. Preferably, the content may be 1.0 to 5.0 parts by weight. When the content of the additive is lower than 1.0 parts by weight, the desired effect may not be obtained. When the content excesses 5.0 parts by weight, flowability may be excessively high, resulting in deterioration of physical properties.

Hereinafter, the configuration and operation of the present invention will be described in more detail with reference to preferred examples of the present invention. However, since the preferred examples are provided only for illustrative purposes, the preferred examples should not be construed to limit of the scope of the present invention. The contents not described herein can be easily inferred technically by those skilled in the art, so the description will be omitted.

Experimental Example 1: Preparation of Resin Composition

A first epoxy resin and a second epoxy resin were added to a planetary mixer and stirred at room temperature and atmospheric pressure for 2 hours to achieve uniform properties, and then a thermal curing agent and an additive were quantified. After adding a thermal curing agent or a mixture of a thermal curing agent and an additive, the mixture was stirred at room temperature and atmospheric pressure for 2 hours. Then, after defoaming in vacuum, a viscous liquid was obtained. Each of the components, the mixing ratio of the components, and the content (parts by weight) of each of the components of each composition used in Examples 1 to 8 and Comparative Examples are shown in Table 1 below.

TABLE 1

|     | Example 1 | Example 2 | Example 3 | Example 4 | Example 5 | Example 6 | Example 7 | Example 8 | Comparative example 1 | Comparative example 2 | Comparative example 3 |
|-----|-----|-----|-----|-----|-----|-----|-----|-----|-----|-----|-----|
| A-1 | 20 | 20 | 20 | 30 | 10 | — | 7.5 | — | 20 | 20 | — |
| A-2 | — | — | — | — | — | 20 | 7.5 | 21 | — | 30 | 20 |
| B-1 | 80 | 80 | 80 | 70 | 90 | 80 | 65 | 65 | 50 | — | 60 |
| B-2 | — | — | — | — | — | — | 5.0 | 5.0 | 10 | 30 | 10 |
| B-3 | — | — | — | — | — | — | — | — | 20 | 20 | — |
| C | 1.4 | 1.2 | 0.5 | 1.2 | 1.2 | 1.2 | 1.2 | 1.2 | 1.3 | 1.3 | 1.3 |
| D | — | — | — | — | — | — | 15 | 10 | — | — | 10 |

A-1: Bifunctional liquid epoxy resin, 2,2'-[(1-methylethylidene)bis(4,1-phenyleneoxymethylene)]bisoxirane
A-2: Bifunctional liquid epoxy resin, Phenol, polymer with formaldehyde, glycidyl ether
B-1: Bifunctional liquid epoxy resin, (3',4'-Epoxycyclohexane)methyl 3,4-epoxycyclohexylcarboxylate
B-2: Trifunctional liquid epoxy resin, 1,2-epoxy-4-(2-oxiranyl)cyclohexane of 2,2-bis(hydroxy methyl)-1-butanol
B-3: Mono-functional liquid epoxy resin, p-tertiary butyl phenyl glycidyl ether.
C: Thermal curing agent, Phenyl amine borate
D: Additive, Mono[p-(alpha-methylbenzyl)] ether glycol polyethylene Experimental Example 2: Evaluation of Physical Properties of Resin Composition The appearance of the cured product, viscosity, adhesive force, refractive index, moisture resistance, stability at 25° C., and stability at 40° C. of the resin compositions prepared in Examples 1 to 8 and Comparative Examples were evaluated according to the following criteria and the results are shown in Table 2.

1. Appearance of the cured product: After pouring the resin composition into a mold and curing in an oven adjusted to 100° C. and 50 minutes, the appearance of the cured product was investigated.
2. Viscosity: Using Brookfield DV2T viscometer and cone-and-plate type CPA-51Z spindle, measured at 25±5° C., and after 30 minutes, when there was no scale in the viscometer chamber and the viscosity was between 300 and 500 mpa·s, viscosity was recorded.
3. Adhesive force: After applying 0.01 g of resin composition on a 76 mm×26 mm×3 mm glass plate, pressing, curing in an oven set at 100° C. for 50 minutes and measuring the adhesive force in UTM. When it was 2 kgf/cm² or more, it was marked as O, and when it was less than 2 kgf/cm², it was marked as X.
4. Refractive index: The refractive index of the resin composition was measured with an Abbe refractometer at 25±5° C.
5. Moisture resistance: After applying 0.01 g of the resin composition on a glass plate, cured in an oven set at 100° C. for 50 minutes to prepare a specimen, and leaving the specimen at 85° C. and 85% chamber, the specimen was left for 7 days. When there was no crack between the composition and the glass plate or between the compositions, it was marked as O and when cracks were generated, it was marked as X.
6. Stability (25° C.): The resin composition and nitrogen gas were filled in a glass bottle sealed with a rubber cap, and left at 25±5° C. Viscosity was measured every 7 days. When the rate of change in viscosity was 1.2 times or less compared to the initial viscosity, the stability was recorded.
7. Stability (40° C.): The resin composition and nitrogen gas were filled in a glass bottle sealed with a rubber cap, and left at 40±5° C. Viscosity was measured every day. When the rate of change in viscosity was 1.2 times or less compared to the initial viscosity, the stability was recorded.
8. Weight loss: 1 g of the resin composition was weighed in a petri dish, put into a chamber of a VC-500S, a high vacuum oven model name of YMRTC, and then reduced pressure for 2 hours at 25° C.

The weighed resin composition was measured as A(g). The resin under reduced pressure was measured as B(g), and the weight loss (%) was calculated and described as {100−(B/A)×100}.

9. Fume evaluation: The resin composition was coated with a glass thickness of 300 μm on a release paper on both sides, cured using an exposure system, and then a film was obtained.

After putting the obtained film in the gas-chromatography equipment (OP2010 Ultra of Shimadzu), the equipment was left at 100° C. for 1 hour, and the weight of the collected fume before and after leaving it was measured and recorded.

TABLE 2

|  | Example 1 | Example 2 | Example 3 | Example 4 | Example 5 | Example 6 | Example 7 | Example 8 | Comparative example 1 | Comparative example 2 | Comparative example 3 |
|---|---|---|---|---|---|---|---|---|---|---|---|
| Appearance | Transparent | Transparent | Transparent | Transparent | Transparent | Transparent | Yellow transparent | Yellow transparent | Yellow transparent | Yellow transparent | Yellow transparent |
| Viscosity (mPa·s) | 485 | 475 | 460 | 515 | 434 | 471 | 468 | 460 | 389 | 550 | 710 |
| Adhesive force [kgf/inch2] | O | O | O | O | O | O | O | O | O | O | O |
| Refractive index | 1.51 | 1.51 | 1.51 | 1.51 | 1.51 | 1.51 | 1.51 | 1.51 | 1.50 | 1.52 | 1.52 |

TABLE 2-continued

|  | Example 1 | Example 2 | Example 3 | Example 4 | Example 5 | Example 6 | Example 7 | Example 8 | Comparative example 1 | Comparative example 2 | Comparative example 3 |
|---|---|---|---|---|---|---|---|---|---|---|---|
| Moisture resistance | ○ | ○ | ○ | ○ | ○ | ○ | ○ | ○ | ○ | ○ | ○ |
| Stability (25° C.) | >3 months | >3 months | >3 months | >3 months | >3 months | >3 months | >3 months | >1 month | >1 month | >1 month | >1 month |
| Stability (40° C.) | 7 days | 9 days | 11 days | 4 days | 5 days | 3 days | 2 days | 3 days | 2 days | 2 days | 1 days |
| Weight loss | −0.1 | −0.2 | −0.3 | −0.1 | −0.3 | −0.1 | −0.5 | −0.6 | −1.1 | −2.0 | −1.5 |
| Hume | 0.003 | 0.002 | 0.002 | 0.005 | 0.10 | 0.11 | 0.30 | 0.45 | 1.1 | 1.5 | 1.4 |

As shown in Table 1, it can be confirmed that the resin compositions prepared in Examples 1 to 6 of the present invention result in a transparent cured product and have a suitable viscosity level, high adhesive force, a refractive index of 1.5 or more, good moisture resistance, and good stability.

In the case of Examples 7 and 8 using a bifunctional epoxy resin such as A-2 and trifunctional epoxy resin such as B-2, it was confirmed that although other physical properties were good, but the appearance of the cured product was shifted to a more yellow color and the stability (40° C.) decreased. In addition, as in Examples 7 and 8, as the additive was included, the viscosity decreased despite of the presence of a high viscosity trifunctional epoxy resin, but the stability (40° C.) continuously decreased.

From the evaluation of the physical properties, it was confirmed that the resin compositions in Examples 1 to 6 can be usefully used as a next generation organic light emitting display resin composition by not only having the chemical and physical properties required as a one-component resin composition having a transparent structure, high adhesive force, and high reliability, but also obtaining the related physical properties showing smooth operation of a user.

The invention claimed is:

1. A resin composition comprising a first epoxy resin, a second epoxy resin, and a thermal curing agent,
    wherein when the resin composition is prepared as a film and is measured with a spectrometer in a wavelength range of 400 nm to 780 nm, the resin composition exhibits a transmittance of 90% or more and
    when the resin composition is measured with a refractometer, the resin composition exhibits a refractive index of 1.4 or more and
    wherein the first epoxy resin is a 2-4 functional epoxy resin,
    wherein the second epoxy resin is a 2-4 functional epoxy resin,
    wherein the resin composition comprises 10 to 30 parts by weight of the first epoxy resin and 70 to 90 parts by weight of the second epoxy resin, and the thermal curing agent comprises 0.5 to 1.4 parts by weight of the thermal curing agent,
    wherein the first epoxy resin comprises a compound represented by Chemical Formula 1 below, Chemical Formula 1

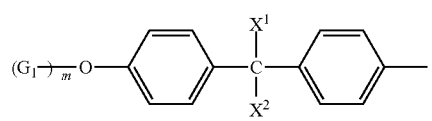

-continued

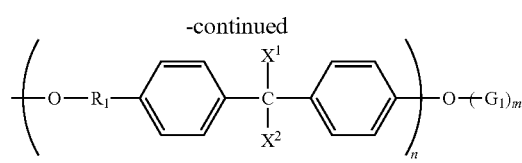

wherein in Chemical Formula 1,
$G_1$ is an organic group containing a glycidyl group,
$X^1$ and $X^2$ are each independently hydrogen or a methyl group,
$R_1$ is a substituted or unsubstituted alkylene or alkenylene having 10 to 100 carbon atoms, and
n is 10,
m is an integer in the range of 0 to 1,
wherein the second epoxy resin comprises an epoxy resin including a compound represented by Chemical Formula 2 below, Chemical Formula 2

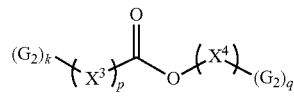

wherein in Chemical Formula 2,
$G_2$ is an organic group containing a glycidyl group,
$X^3$ and $X^4$ are each independently substituted or unsubstituted alkylene or alkenylene having 1 to 100 carbon atoms,
k is an integer in the range of 1 to 10, and
p and q are each independently an integer in the range of 0 to 10.

2. The composition of claim 1, wherein the resin composition has a viscosity of 10 to 100000 cPs and a thixotropic index of 1 to 3 when measured with a viscometer at 25° C. and a speed of 5 rpm.

3. The composition of claim 1, wherein when the resin composition is applied to a glass thickness of 300 μm on each side of release paper, is then cured using an exposure system, and is left at 90° C. for 1 hour in a convection oven, the resin composition generates fumes of 1% or less when the weight of the resin composition is measured before and after being left in the convection oven.

4. The composition of claim 1, wherein the second epoxy resin includes any one selected from the group consisting of an epoxy resin including a phthalic acid modified epoxy resin, a phthalic acid modified epoxy resin having a transparent structure, a polypropylene glycol added epoxy resin having a transparent structure, a polyethylene glycol added epoxy resin having a transparent structure, and a cycloaliphatic epoxy resin.

5. The composition of claim 4, wherein the transparent structure is prepared with any one component selected from a substituted or unsubstituted alkylene or alkenylene group, or a cyclic aliphatic hydrocarbon group, each group having 10 to 100 carbon atoms.

6. The composition of claim 1, wherein the first epoxy resin includes any one or more selected from the group consisting of a bisphenol F diglycidyl ether epoxy resin, a bisphenol A diglycidyl ether epoxy resin, a polyolefin addition bisphenol A diglycidyl ether epoxy resin, a polyolefin addition bisphenol F diglycidyl ether epoxy resin, a 1,6-hexanediol diglycidyl ether epoxy resin, a 1,4-butanediol diglycidyl ether epoxy resin, and a cycloaliphatic Di glycidyl ether epoxy resin.

7. The composition of claim 1, wherein the second epoxy resin is a polyfunctional epoxy resin that is tri- or higher-functional, and the tri- or higher-polyfunctional epoxy resin includes any one or more selected from the group consisting of a phenol novolac epoxy resin, a cresol novolac epoxy resin, a bisphenol A modified phenol novolac epoxy resin, a liquid bismaleimide added epoxy resin, trimethylolpropane triglycidyl ether epoxy resin, polyvalent cycloaliphatic epoxy resin, triglycidyl isocyanurate epoxy resin, aminophenol addition diglycidyl ether epoxy resin, N,N,N',N'-tetraglycidyl-4,4'-methylenebisbenzeneamine resin, and polyvalent oxetane resin.

8. The composition of claim 1, wherein the thermal curing agent includes any one or more selected from the group consisting of tetradecyl (trihexyl) phosphonium dicyandiamide, 1-butyl-3-methylimidazolium tetrafluoroborate, 1-ethyl-3-methylimidazolium tetrafluoroborate, 1-ethyl-3-methylimidazolium methanesulfonate, tolylcumyl iodonium tetrakis(pentafluorophenyl)borate, 2-ethyl-4methyl imidazolium tetraphenylborate, tetraphenylphosphonium tetraphenylborate, quaternary ammonium borate, (4-acetoxyphenyl)benzyl(methyl) sulfonium, and tetrakis(pentafluorophenyl)borate.

9. The composition of claim 1, wherein the resin composition further comprises 0.1 to 10 parts by weight of an additive.

10. The composition of claim 1, wherein the resin composition is a liquid phase or a paste phase.

* * * * *